(12) United States Patent
Al-Nakhli et al.

(10) Patent No.: US 11,268,017 B2
(45) Date of Patent: Mar. 8, 2022

(54) SYSTEMS, METHODS, AND COMPOSITIONS FOR RESERVOIR STIMULATION TREATMENT DIVERSION USING THERMOCHEMICALS

(71) Applicants: Saudi Arabian Oil Company, Dhahran (SA); KING FAHD UNIVERSITY OF PETROLEUM AND MINERALS, Dhahran (SA)

(72) Inventors: Ayman Al-Nakhli, Dhahran (SA); Mohamed Ahmed Nasr Eldin Mahmoud, Dhahran (SA)

(73) Assignees: SAUDI ARABIAN OIL COMPANY, Dhahran (SA); KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 56 days.

(21) Appl. No.: 16/817,305

(22) Filed: Mar. 12, 2020

(65) Prior Publication Data

US 2021/0284899 A1   Sep. 16, 2021

(51) Int. Cl.
*C09K 8/594* (2006.01)
*C09K 8/72* (2006.01)
(Continued)

(52) U.S. Cl.
CPC .............. *C09K 8/72* (2013.01); *C09K 8/594* (2013.01); *C09K 8/607* (2013.01); *E21B 43/164* (2013.01);
(Continued)

(58) Field of Classification Search
CPC ...... E21B 43/168; E21B 43/164; C09K 8/594
See application file for complete search history.

(56) References Cited

U.S. PATENT DOCUMENTS

| 4,232,741 A | 11/1980 | Richardson et al. |
| 4,706,752 A * | 11/1987 | Holm .................... E21B 43/164 166/403 |

(Continued)

FOREIGN PATENT DOCUMENTS

| WO | 2017123937 A1 | 7/2017 |
| WO | 2018004624 A1 | 1/2018 |

OTHER PUBLICATIONS

Fadele, O.; et al.; "Matrix Acidizing in Gas Wells", paper SPE 59771 presented at the SPECERI Gas Technology Symposium Calgary, Canada, Apr. 3-5, 2000.
(Continued)

*Primary Examiner* — Catherine Loikith
(74) *Attorney, Agent, or Firm* — Bracewell LLP; Constance G. Rhebergen; Kevin R. Tamm (57) ABSTRACT

Reservoir stimulation treatment diversion methods, systems, and compositions. One method includes identifying a reservoir requiring liquid stimulation treatment in a lesser-permeability portion of the reservoir. The method includes identifying a greater-permeability portion of the reservoir, the greater-permeability portion of the reservoir having a greater permeability than the lesser-permeability portion. The method also includes disposing a gas in the greater-permeability portion of the reservoir; injecting a liquid stimulation treatment into the reservoir, and allowing the gas in the greater-permeability portion of the reservoir to divert the liquid stimulation treatment into the lesser-permeability portion to stimulate fluid production from the lesser-permeability portion of the reservoir.

23 Claims, 7 Drawing Sheets

(51) Int. Cl.
  *C09K 8/60* (2006.01)
  *E21B 43/16* (2006.01)
  *E21B 43/24* (2006.01)
  *E21B 43/26* (2006.01)
  *E21B 47/00* (2012.01)
  *E21B 49/00* (2006.01)

(52) U.S. Cl.
  CPC ............ *E21B 43/168* (2013.01); *E21B 43/24* (2013.01); *E21B 43/26* (2013.01); *E21B 47/00* (2013.01); *E21B 49/00* (2013.01)

(56) References Cited

U.S. PATENT DOCUMENTS

| | | | |
|---|---|---|---|
| 4,848,465 | A | 7/1989 | Hazlett |
| 4,941,533 | A | 7/1990 | Buller et al. |
| 6,035,933 | A | 3/2000 | Khalil et al. |
| 7,148,184 | B2 | 12/2006 | Francini et al. |
| 9,334,721 | B2 | 5/2016 | Al Dahlan et al. |
| 9,488,042 | B2 | 11/2016 | Al-Nakhli et al. |
| 9,556,718 | B2 | 1/2017 | Al-Dahlan et al. |
| 9,701,894 | B2 | 7/2017 | Al-Nakhli et al. |
| 9,803,133 | B2 | 10/2017 | Al-Nakhli et al. |
| 9,951,265 | B2 | 4/2018 | Almutairi |
| 10,053,614 | B2 | 8/2018 | Al-Nakhli et al. |
| 10,151,186 | B2 | 12/2018 | Al-Nakhli |
| 2013/0126169 | A1 | 5/2013 | Al-Nakhli et al. |
| 2016/0244659 | A1 | 8/2016 | Shahin et al. |
| 2017/0130570 | A1 | 5/2017 | Al-Nakhli et al. |
| 2019/0010795 | A1 | 1/2019 | Lo Cascio et al. |

OTHER PUBLICATIONS

Hill, A. D., et al.;"Fluid Placement and Diversion in Matrix Acidizing", paper SPE 27982 presented at the University of Tulsa Centennial Petroleum Engineering Symposium, Tulsa, USA, Aug. 29-31, 1994.

U.S. Appl. No. 16/840,081, "Removal of Water Blockage in Tight Gas Reservoir Using Thermochemical Fluids", filed Apr. 3, 2020.

Hull et al., "Bromate oxidation of ammonium salts: In situ acid formation for reservoir stimulation," Inorg. Chem., vol. 58(5), Mar. 4, 2019: pp. 3007-3014.

International Search Report and Written Opinion of PCT Application No. PCT/US2021/021862 dated Jun. 25, 2021: pp. 1-11.

\* cited by examiner

SYSTEMS, METHODS, AND COMPOSITIONS FOR RESERVOIR STIMULATION TREATMENT DIVERSION USING THERMOCHEMICALS

BACKGROUND

Field

The present disclosure relates generally to gas diversion of liquid stimulation treatments in reservoirs. Specifically, the disclosure relates to the use of thermochemicals to generate heat and gas to direct stimulation treatments such as acidizing treatments in hydrocarbon-bearing formations.

Description of the Related Art

Heterogeneous carbonate and sandstone reservoirs with varying internal permeabilities require chemical or mechanical diversion during stimulation processes to have uniform treatments, for example, acid treatments along a stimulated interval. Mechanical diverters such as ball sealers can be used in sandstone reservoirs, and chemical diverters such as gelled acids can be used in carbonate reservoirs.

Chemical diverters such as in situ gelled-acid-based polymers and visco-elastic surfactant (VES)-based acids are used extensively in carbonate reservoir stimulation. However, these chemical diverters are proven to cause damage in carbonate reservoirs. Acid diversion is important when stimulating vertical wells with extended target zones and horizontal wells in carbonate formations. In heterogeneous formations, the injected acid will flow primarily into greater-permeability zones. Poor acid distribution reduces overall efficiency of these stimulation treatments, particularly in lesser-permeability zones. In carbonate reservoirs, for example, the permeability contrast can be a factor of 10 between greater-permeability and lesser-permeability zones, such as 200 milliDarcy (mD) for a greater-permeability zone and 20 mD for a lesser-permeability zone. In sandstone reservoirs, the permeability contrast can be a factor of 2, such as 100 mD for a greater-permeability zone and 50 mD for a lesser-permeability zone.

Also, stimulation treatment diversion, for example, acid stimulation diversion, is important in formations with naturally-fractured reservoirs, permeability variability throughout the formation, lithology variations, and damage variability throughout the formation. The molecular weight of the polymers used in stimulation diversion treatments causes them to filter out on the face of formations, causing damage in formation faces. In addition, washout may occur on the face of formations, and deep penetration of stimulation treatments may not be achieved in the case of tight reservoirs (for example, less than about 1 mD permeability). Hydrochloric acid concentrations can be quickly depleted, and acids then have difficulty penetrating deep into formations for stimulation treatment. Polymer residues inside a formation can cause formation damage that results in reduced hydrocarbon production. For example, crosslinker precipitation at acidic pH values inside formations as used in state of the art stimulation diversion treatments causes formation damage and production difficulties. Current mechanical and chemical stimulation treatment diversion techniques are not suitable in reservoirs with varying permeability zones.

SUMMARY

Applicant has recognized a need for compositions, systems, and methods for in situ gas diversion of stimulation treatments away from greater-permeability zones and toward lesser-permeability zones. The present disclosure shows compositions, systems, and methods for gas diversion of stimulation treatments in hydrocarbon-bearing formations, or other reservoirs, where gas can be generated in situ, provided from the surface, or both. One or more exothermic reaction component can be pumped or injected into a wellbore in addition to or alternative to a formation suffering from reduced production, for example, before, during, or after hydraulic fracturing, or in the absence of hydraulic fracturing. An open-hole or cased-hole recovery well can be used to inject the exothermic reaction component. Gas generated by chemical reactions in situ in addition to or alternative to gas provided from the surface can be used to direct stimulation treatments such as heat treatments and acidizing treatments away from greater-permeability zones toward lesser-permeability zones.

Gas generated in situ from thermochemical reactions can be used to act as a viscous diverter in oil and water wells. Gas disposed in lesser-permeability zones in a hydrocarbon-bearing formation will divert liquid acids and other liquid fluid treatments toward lesser-permeability zones in reservoirs without using additional chemical diversion, such as gelled acids, polymers, or visco-elastic surfactants. Required amounts of gas to be generated in situ or supplied from the surface for disposal in greater-permeability zones depends, in part, on the level of reservoir heterogeneity. Generated heat from reactions in situ reduces reservoir fluid viscosity near the wellbore, and this synergistically increases the viscous diversion effect of gases disposed in greater-permeability zones driving fluid treatments such as acids to lesser-permeability zones.

As explained, gas can be supplied at the surface and injected into greater-permeability zones of hydrocarbon-bearing formations in addition to or alternative to can be generated in situ from thermochemical, optionally exothermic or endothermic, reactions. Certain thermochemical reactions can also co-produce acid in situ with gas for acidic self-diversion, where generated gas proceeds to greater-permeability zones and in situ generated liquid acid is driven to lesser-permeability zones. (See Equations 2 and 3). Additionally or alternatively, thermochemicals (that will produce gas and steam) can be co-injected with an acid. Any gas generated downhole flows into greater-permeability zones and forces the acid to treat lesser-permeability zones.

In certain embodiments, suitable thermochemicals react together at acidic pH and produce nitrogen gas, steam, and acid in situ in a wellbore or formation. After gas is produced, due to greater pressure proximate the wellbore or formation, gas flows into the formation and invades greater-permeability layers, and then the acid (generated in situ, injected from the surface, or both) will be disposed into the formation in lesser-permeability layers. Because of the lesser gas viscosity compared to other environmental fluids, the gas acts as diverter by becoming disposed in greater-permeability zones and forcing fluids such as acids to stimulate the lesser-permeability zones (described further with regard to FIG. 1). In certain embodiments gases, either generated in situ or injected from the surface, do not cause fracturing, and similarly, in some embodiments injected acids or in situ generated acids do not cause fracturing, rather stimulation of lesser-permeability zone, for example by decrease of surface tension in a lesser-permeability zone.

Figure 2A:
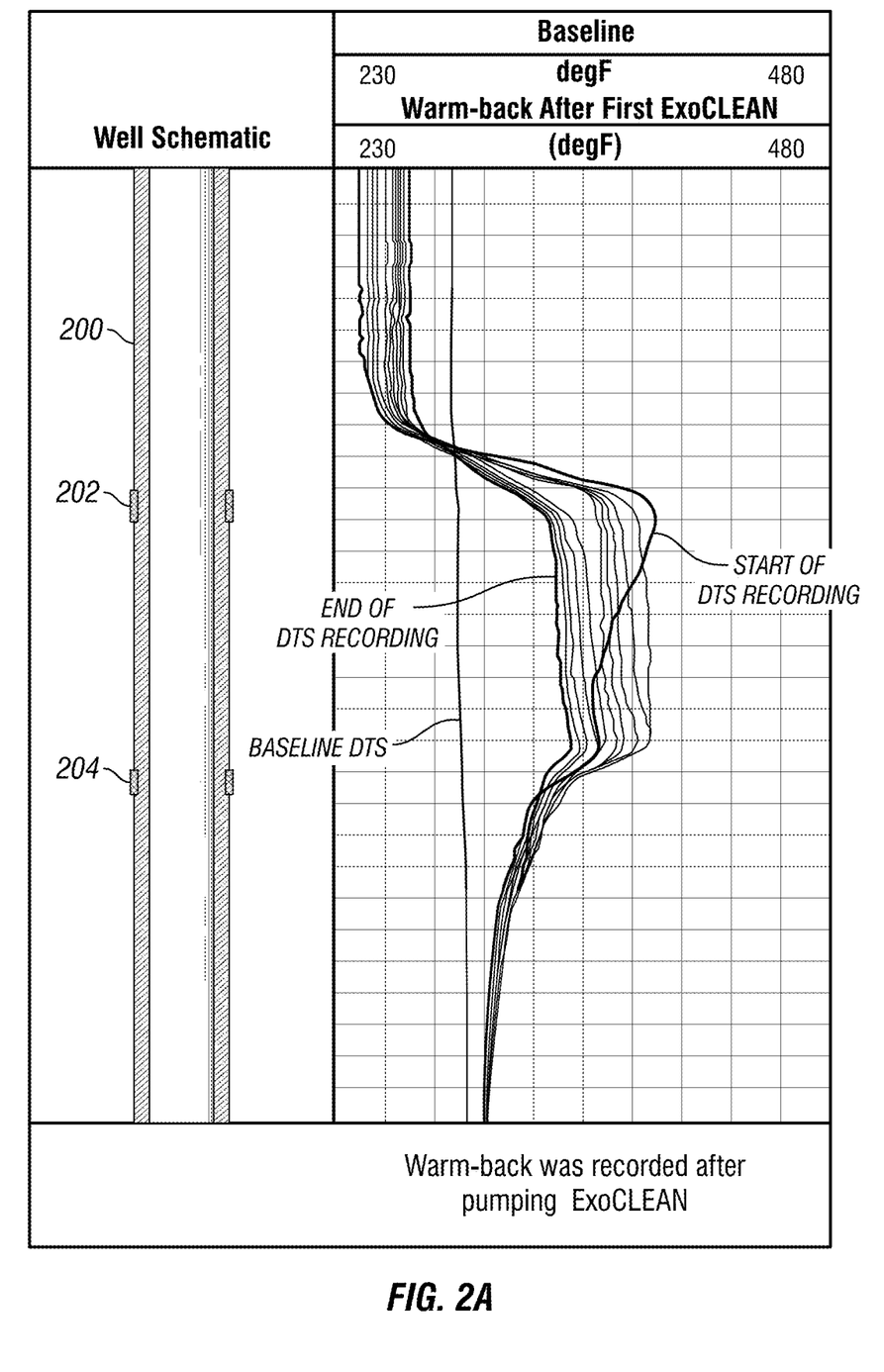
FIGS. 2A and 2B show distributed temperature sensing (DTS) profiles of a wellbore in a gas well before and after gas diversion of exothermic thermochemicals from a greater-permeability zone to a lesser-permeability zone.
Figure 2B:
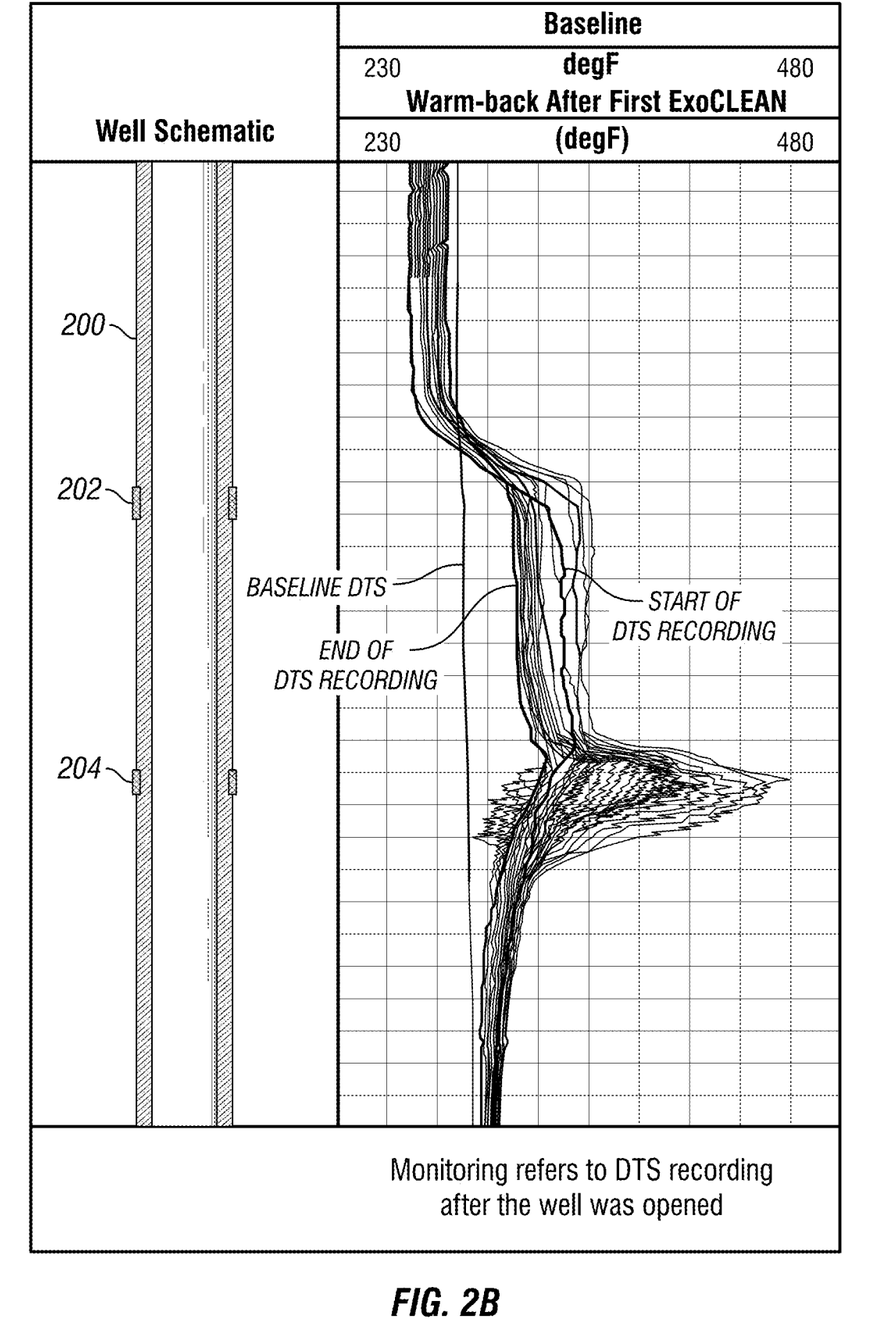

In Examples described further with respect to the Figures, exothermic thermochemicals were injected into gas wells, and recorded distributed temperature sensing (DTS) showed generated heat followed by stimulation treatment diversion from one portion of a reservoir to another due to gas generation (described further with regard to FIG. 2). In certain embodiments described here, foam generation, for example, acidized foam, is not desired nor required. Treatments described here can be applied in oil wells, gas wells, wells with water damage, and other wells in formations in which stimulation treatment diversion is required due to differences in permeabilities between zones.

Generated heat also reduces reservoir fluid viscosity, and this synergistically aids in diverting stimulation treatments to lesser-permeability zones. Fracturing need not be cause by the gases or stimulation treatments. Treatments are suitable in wellbores and reservoirs up to about 200° C. or up to about 300° C. In some embodiments, the volume of gas can expand to areas covering an about 10 foot (ft.) radial distance outwardly from a wellbore into a reservoir. In addition, in some embodiments, salt generated from certain thermochemical reactions will advantageously stabilize clay minerals in the reservoir.

Therefore, disclosed here is a reservoir stimulation treatment diversion method, the method including identifying a reservoir requiring liquid stimulation treatment in a lesser-permeability portion of the reservoir; identifying a greater-permeability portion of the reservoir, the greater-permeability portion of the reservoir having a greater permeability than the lesser-permeability portion; disposing a gas in the greater-permeability portion of the reservoir; injecting a liquid stimulation treatment into the reservoir; and allowing the gas in the greater-permeability portion of the reservoir to divert the liquid stimulation treatment into the lesser-permeability portion to stimulate fluid production from the lesser-permeability portion of the reservoir.

In some embodiments, the permeability of the greater-permeability portion is greater than about 80 mD and the permeability of the lesser-permeability portion is less than about 40 mD. In some embodiments, the permeability of the greater-permeability portion is greater than about 200 mD and the permeability of the lesser-permeability portion is less than about 20 mD. In some embodiments, the permeability of the greater-permeability portion is greater than about 100 mD and the permeability of the lesser-permeability portion is less than about 50 mD.

In some embodiments of the method, the step of disposing is carried out before the step of injecting. Still in other embodiments, the step of disposing is carried out during the step of injecting. In certain other embodiments, the step of disposing is carried out after the step of injecting. In yet other embodiments, the step of disposing includes injecting a gas from the surface into the greater-permeability portion, the gas including at least one component selected from the group consisting of: carbon dioxide, methane, ethane, and nitrogen. In certain embodiments, the step of disposing includes generating gas in situ in the reservoir by reacting thermochemicals. Still in other embodiments, the thermochemicals include ammonium ions and nitrite ions. In other embodiments, the step of injecting includes injecting an acid composition including at least one acid selected from the group consisting of: hydrochloric acid and hydrofluoric acid.

In still other embodiments, the step of injecting includes injecting a composition that reacts in situ to produce an acid and the gas, the acid selected from the group consisting of: hydrochloric acid, hydrofluoric acid, and combinations of the same. In certain other embodiments, the method includes the step of verifying stimulated fluid production from the lesser-permeability portion of the reservoir by calculating decreased skin damage for the lesser-permeability portion. Still in other embodiments, the permeability of the lesser-permeability portion is increased by at least 50% or 100%. In some embodiments, the thermochemicals comprise a component selected from the group consisting of: ammonium chloride, ammonium bromide, ammonium nitrate, ammonium sulfate, ammonium carbonate, ammonium hydroxide, and combinations thereof.

In yet other embodiments, the thermochemicals comprise a component selected from the group consisting of: sodium nitrite, potassium nitrite, and combinations thereof. In certain other embodiments, the thermochemicals comprise $NH_4Cl$ and $NaNO_2$. Still in other embodiments, the concentration of the $NH_4Cl$ and $NaNO_2$ are about 1 molar and the $NH_4Cl$ and $NaNO_2$ are injected separately during the step of injecting and combined in situ to exothermically react. Still in other embodiments, the thermochemicals are triggered at a temperature in situ between about 50° C. and about 300° C. In some embodiments, the reservoir comprises at least one component selected from the group consisting of: limestone and dolomite. In some embodiments, the method includes the step of activating the thermochemicals with at least one of microwaves, an acid, or combinations of the same. Still in other embodiments, the step of injecting is selected from an injection type of continuous injection, cyclic injection, huff-n-puff injection, and combinations of the same. In some embodiments, the steps of disposing and injecting are carried out separately so as not to create foam or foamed acid.

In some embodiments, the step of disposing a gas in the greater-permeability portion of the reservoir does not cause fracturing. In some embodiments, the step of injecting a liquid stimulation treatment in the reservoir does not cause fracturing. In some embodiments, the steps of disposing a gas in the greater-permeability portion of the reservoir and injecting a liquid stimulation treatment in the reservoir do not cause fracturing.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of compositions, systems, and methods for thermochemical stimulation diversion treatment in hydrocarbon-bearing reservoirs, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Figure 1:
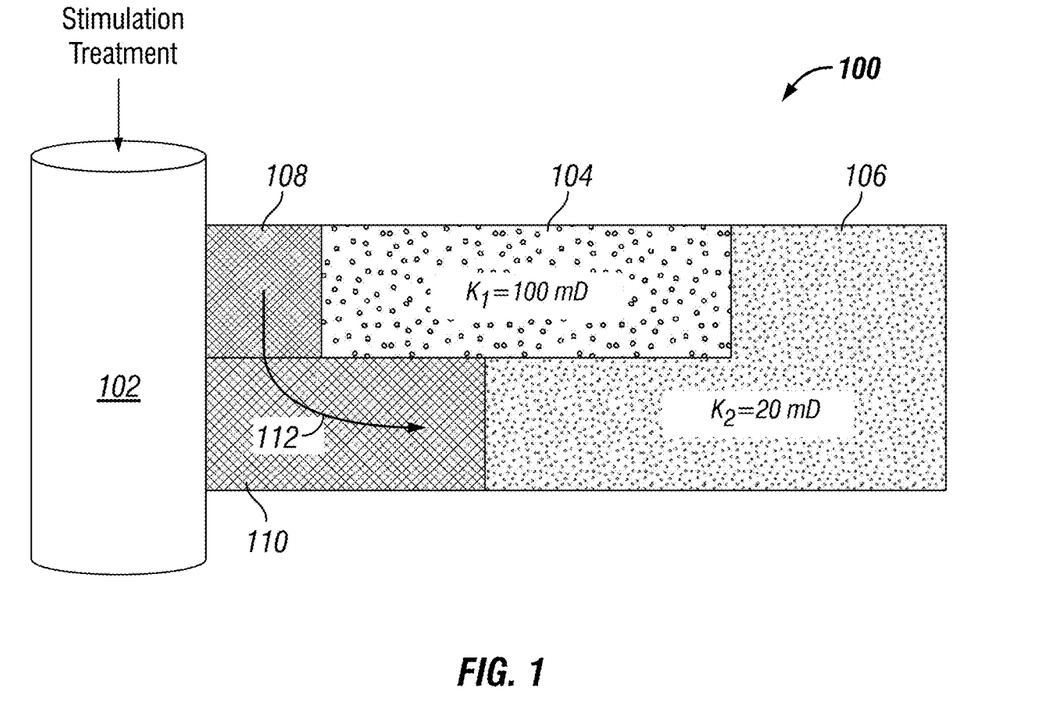
FIG. 1 is a schematic representation of a directed or targeted stimulation treatment using gas diversion in a reservoir.

FIG. 1 is a schematic representation of a directed or targeted reservoir stimulation treatment, for example, acidizing treatment, applying gas diversion. In hydrocarbon-bearing reservoir with varying permeability 100 is disposed a wellbore 102, either open-hole or cased-hole. As shown, hydrocarbon-bearing reservoir with varying permeability 100 includes a greater-permeability zone 104 at about 100 milliDarcy (mD) and a lesser-permeability zone 106 at about 20 mD. After some amount of production from hydrocarbon-bearing reservoir with varying permeability 100, oil in addition to or alternative to gas can remain trapped in lesser-permeability zone 106, and a stimulation treatment such as an acid treatment is required. A stimulation treatment such as an acidizing treatment is required to release oil and gas trapped in lesser-permeability zone 106, while acid should not be lost to greater-permeability zone 104 where fluids flow more easily. Therefore, a gas is disposed in greater-permeability zone 104. Once gas is disposed in greater-permeability zone 104, stimulation treatment is diverted to diversion zones 108, 110 away from the greater-permeability zone 104.

Embodiments of systems and methods described here can be applied in a wide variety of formation types at a variety of depths from shallow wells, less than about 5000 ft., to deep wells, as great as about 15000 ft. below the surface. Systems and methods can be applied in horizontal and vertical wells. Generated gases generally will be disposed above liquids, in part, because of gravity effects. Acidizing and other stimulation treatments may stimulate via fracturing or microfracturing of a formation, or in other embodiments no fracturing or microfracturing is caused, but instead interfacial surface tension is reduced to allow fluids to flow out of the reservoir through a wellbore.

In some embodiments, gas is injected from the surface through wellbore 102 to be disposed in greater-permeability zone 104, in addition to or alternative to being generated in situ by thermochemicals, such as exothermic thermochemicals or others (See, for example, Equations 1-3). Acid can be generated simultaneously in situ by certain thermochemical reactions, optionally exothermic or endothermic, and acid can additionally or alternatively be injected from the surface through wellbore 102, for example, hydrochloric acid or hydrofluoric acid. Acid can be injected in addition to or alternative to be generated before, during, or after gas injection or gas generation.

For example, in some embodiments, gas is injected into a formation such as hydrocarbon-bearing reservoir with varying permeability 100 from an external source from the surface through a wellbore such as wellbore 102, then acid treatment subsequently follows, either or both with acid injection from the surface or acid generation in situ. Other stimulation fluids such as surfactants for surface tension modification can also be injected. Gas occupies greater-permeability zones such as greater-permeability zone 104, without fracturing such zone, leaving the lesser-permeability zones for the acid to penetrate and stimulate due to a viscous diversion effect. An improved diverted treatment flow path 112 is created through diversion zones 108, 110 for a liquid stimulation treatment to avoid greater-permeability zone 104 and to interact with trapped hydrocarbons in lesser-permeability zone 106.

Suitable gases for injection in addition to or alternative to generation in situ include carbon dioxide, methane, ethane, and nitrogen. A suitable injection pressure range from the surface is between about 1,000 to about 3,000 pounds per square inch gauge ("psig"), and a suitable temperature range for the gas being injected from the surface is between about 150° F. (Fahrenheit) to about 300° F. A suitable range for gas injection rate from the surface is between about 0.5 barrels/minute (bbl/min) to about 10 bbl/min.

In certain embodiments, in situ application of exothermic thermochemicals is applied as a source for gas generation in addition to or alternative to acid generation. Gas and acid can be generated downhole from chemical reactions of thermochemicals. In some embodiments, where the concentration, volume, and reaction rate of the exothermic thermochemicals produces a pressure pulse, the pressure pulse generated from the reaction pushes gas and acid into a formation. Gas first occupies greater-permeability zones such as greater-permeability zone 104 and diverts acid to lesser-permeability zones, such as lesser-permeability zone 106. No external supply source for gas is needed in some embodiments. Thermochemical reactions can be designed based on concentration, volume, reactant type, and activation timing to properly control and optimize the amount of generated gas and acid to ensure a successful treatment. A variety of acids can be generated from suitable chemical reactions including, for example, HCl, HF, and combinations of the same.

The example exothermic thermochemical treatment composition tested in the systems and methods included a reagent pairing of aqueous sodium nitrite ($NaNO_2$) and ammonium chloride ($NH_4Cl$). Generally equimolar concentrations (for example, about 1 Molar (M) each or 3 M of each) of reactants can be used. The reaction is exothermic and takes place as shown in Equation 1.

$$NH_4Cl_{(aq)} + NaNO_{2(aq)} \rightarrow N_{2(g)} + NaCl_{(aq)} + 2\ H_2O + Heat \qquad \text{Eq. 1}$$

In Equation 1 a catalyst and/or initiator can be applied, and the catalyst/initiator can include acidic $H^+$ ions (for example, from acetic or hydrochloric acid) in addition to or alternative to heat in addition to or alternative to microwaves. As the reaction proceeds, intermediate thermolabile products are created, and these ultimately disintegrate into brine (NaCl), nitrogen gas, and steam.

The reaction of Equation 1 can be activated by heating to a certain temperature, the activation temperature being dependent in part on pH and pressure. Other methods exist for activating exothermic reactions of thermochemicals such as changing pH or applying microwaves. Treatment compositions, methods, and systems of the present disclosure can be applied during or after several operations such as drilling, acidizing, and fracturing operations to reduce and remove water damage induced during and after these processes.

As shown in Equation 1, nitrogen gas is generated as a product to occupy greater-permeability zones in a reservoir such as greater-permeability zone 104. In addition to in situ gas generation such as nitrogen gas generation, acids can be generated in situ, for example, hydrofluoric acid (HF) can be generated in situ for stimulation treatment and diversion to a lesser-permeability zone by gas diversion. In one example, HF can be generated in situ according to Equation 2, further described in Hull, et al. titled "Bromate Oxidation of Ammonium Salts: In Situ Acid Formation for Reservoir Stimulation" dated Feb. 19, 2019 and published by the American Chemical Society:

$$2NH_4F+NaBrO_3+\Delta H \text{ (heat)} \rightarrow 2HF+NaBr+3H_2O+N_2 \quad \text{Eq. 2.}$$

In one example, HCl can be generated in situ according to Equation 3:

$$2NH_4Cl+\text{Oxidizer} \rightarrow 2HCl+B+3H_2O+N_2 \quad \text{Eq. 3}$$

A suitable oxidizer in Equation 3 includes ammonium persulfate, but other suitable oxidizers known to those of ordinary skill can be used in addition to or alternative to ammonium persulfate. Equations 1-3, with similar or different reactants, can generally be used at the same time or separately to generate appropriate amounts of gas and heat in situ, optionally along with acid.

FIGS. 2A and 2B show temperature profiles of a wellbore in a gas well before and after gas diversion of exothermic thermochemicals from a greater-permeability zone to a lesser-permeability zone. In FIG. 2A an exothermic thermochemical treatment comprising ammonium ions and nitrite ions was injected into a wellbore 200 with distributed temperature sensors 202, 204. Wellbore 200 is disposed in a gas well proximate a gas reservoir. An exothermic reaction according generally to Equation 1 ensued once activated by temperature and acid addition. FIG. 2A shows the distributed temperature profile immediately after the treatment was pumped into wellbore 200 and activated, and as shown the increase in temperature from "Baseline DTS" to "Start of DTS recording" is concentrated near the upper portion of wellbore 200 proximate distributed temperature sensor 202. Initially wellbore 200 exhibited greater temperatures near the top section, and this indicated that most of the injected treatment fluids were flowing through a greater-permeability zone.

Embodiments disclosed are not limited to a certain depth. Wells in reservoirs between about 5,000 ft. and about 15,000 ft. can be treated. In the example described by FIGS. 2A and 2B, 200 barrels of exothermic treatment fluid were applied to the wellbore 200. One or more exothermic reaction was activated by organic acid that lowered the pH to less than 5. Regarding time lapse for treatment, in FIG. 2A, example exothermic treatment fluid was completely injected at 14:00. FIG. 2A shows temperature profiles between 14:30 to 15:36. Recording for FIG. 2B started at 15:37 and shows temperature profiles proceeding to 19:42.

In FIG. 2B, after the reaction proceeded according to Equation 1 generating nitrogen gas, the exothermic thermochemical liquid treatment was diverted deeper by the nitrogen gas, and the temperature increase became concentrated proximate distributed temperature sensor 204. After the treatment and gas generation, fluids were diverted to a lesser-permeability zone proximate the bottom of the well, shown by the temperature increase proximate distributed temperature sensor 204 from Baseline DTS to increased temperatures. Treatment can proceed for about 1, about 2, about 5, about 10, or greater than about 10 hours, depending on the level of stimulation required.

Viscous Skin Factor

When gas from the surface is injected for diversion in addition to or alternative to being generated in situ, it flows to greater-permeability layers and replaces any remaining reservoir fluids (such as oil or water). When a liquid stimulation treatment fluid such as acid enters a greater-permeability layer occupied by a diverting gas, due to the difference in viscosity between gas and liquid, the gas will divert the liquid to lesser-permeability layers, as shown in FIGS. 2A and 2B.

Viscous skin factor is the additional pressure drop imposed by a large contrast in fluid viscosities between a gas and liquid. Usually liquid viscosity is about 100 times that of a gas. Controlling gas and fluid flow in situ simultaneously therefore becomes difficult. Original skin damage is an additional pressure drop resulting from permeability reduction in the near-wellbore area due to scale precipitation or solids invasion from drilling and completion fluids. Also, original skin damage can be impacted from the fluid-rock interactions in the near-wellbore area.

In the Equations that follow, the following nomenclature and units are applied: $C_{2j}$=rate of skin decrease for a layer j, feet/gallon (ft./gal.); h=formation or layer thickness, ft.; k=formation permeability, mD; $P_w$=wellbore pressure, pounds per square inch (psi); $P_e$=pressure at drainage boundary, psi; $q_i$=injection rate, barrel per minute per foot (bpm/ft.); $r_a$=acid penetration radius, ft.; $r_e$=drainage radius, ft.; $r_g$=gas penetration radius, ft.; $r_w$=wellbore radius, ft.; $S_j$=damage skin factor of layer j; $S_{0,j}$=initial damage skin factor of layer j; $S_{vis}$=viscous skin factor; $V_a$=acid volume, gal.; $V_c$=acid volume to reduce skin to zero, gal./ft.; $V_j$=volume into layer j, gal./ft.; $V_t$=total acid volume, gal./ft.; Ø=porosity; $\mu_{o/w}$=reservoir fluid viscosity (oil/water), centipoise (cP); $\mu_a$=acid viscosity, cP; $\mu_g$=gas viscosity, cp.

In certain embodiments viscous skin factor can be calculated as follows in Equation 4:

$$S_{vis} = \left[\frac{\mu_a}{\mu_g} - 1\right] \ln\left(\frac{r_a}{r_w}\right). \quad \text{Eq. 4}$$

The radius at which a stimulation fluid such as acid penetrates can be calculated from the volume of injected acid as follows:

$$V_a = \pi \text{Ø} h (r_a^2 - r_w^2) \quad \text{Eq. 5.}$$

In Equation 6, $r_a$ is calculated as follows:

$$r_a = \sqrt{r_w^2 + \frac{V_j}{\pi \phi}} \quad \text{Eq. 6}$$

where $V_j$ is the acid volume per unit thickness injected into formation j.

The viscous skin factor of a greater-permeability layer can be calculated as function of injected acid volume in Equation 7:

$$S_{vis} = \left[\frac{\mu_a}{\mu_g} - 1\right]\left(0.5\ln\left(r_w^2 + \frac{V_j}{\pi \phi}\right) - \ln r_w\right). \quad \text{Eq. 7}$$

The skin factor changes each time step as the acid volume changes and, assuming steady state flow, it will affect the acid injection rate at each time step according to Equation 8:

$$\frac{q_i}{h} = \frac{4.92 * 10^{-6} k (P_w - P_e)}{\mu_a \left( \ln\left(\frac{r_e}{r_w}\right) + S + S_{vis} \right)}. \qquad \text{Eq. 8}$$

Then, the volume of the acid will change accordingly to:

$$V_1 = V_0 + \left(\frac{q_i}{h}\right)_0 (t_1 - t_0). \qquad \text{Eq. 9}$$

The original skin damage will also decrease as the acid volume increases until it reaches zero when the acid volume reaches the required volume to remove the damage. Skin damage can be calculated as a function of acid volume by Equation 10:

$$S = S_0 - C \overline{V}_c \qquad \text{Eq. 10}$$

where C is the rate of skin decrease for the layer in ft./gal.

In contrast, a lesser-permeability layer will be occupied only by acid and formation fluid, and perhaps small amount of gas that can be neglected in these calculations. The viscous skin factor can be calculated for lesser-permeability layer using the Equation 11, and one difference is the reservoir fluid viscosity (including oil and water):

$$S_{vis} = \left[\frac{\mu_a}{\mu_{o/w}} - 1\right]\left(0.5\ln\left(r_w^2 + \frac{V_j}{\pi\phi}\right) - \ln r_w\right). \qquad \text{Eq. 11}$$

In case the amount of gas invading a formation is significant, the viscous skin factor can be calculated using the same calculations as those of the greater-permeability layer (Equation 7). One reference further detailing such permeability calculations, including Equations 10 and 11, is Economides, M. J., et al., Petroleum Production Systems, Prentice Hall, 2d edition (Oct. 5, 2012).

EXAMPLES

Models were designed and simulations run for two scenarios of acid treatment for a well in a two-layered water reservoir with different permeability values, 100 mD and 20 mD (See FIG. 1). Gas was used to divert acid into the lesser-permeability layer of 20 mD. Table 1 shows the reservoir, well, and fluid properties applied in both scenarios.

TABLE 1

Input Data for Gas Diversion of Acid Model in Dual-permeability Reservoir, for both Examples 1 and 2.

| Property | Value |
| --- | --- |
| Porosity | 0.2 |
| Reservoir Fluid Viscosity | 1 cP |
| Injected Acid Viscosity | 1.5 cP |
| Gas Viscosity | 0.01 cP |
| $P_w$ | 3,600 psi |
| $P_e$ | 1,600 psi |
| $r_e$ | 1,676 ft. |
| $r_w$ | 0.25 ft. |

TABLE 2

Certain Input Data for Example 1.

| Property | Layer 1 Value | Layer 2 Value |
| --- | --- | --- |
| k | 100 mD | 20 mD |
| h | 20 ft. | 100 ft. |
| $r_d$ | 12 inches (in.) | 12 in. |
| $k_d$ | 10 mD | 2 mD |
| $S_o$ | 12.47 | 12.47 |
| $C_{2,j}$ | 2 ft./gal. | 2 ft./gal. |
| $r_g$ | 10 ft. | Not applicable |

TABLE 3

Certain Input Data for Example 2.

| Property | Layer 1 Value | Layer 2 Value |
| --- | --- | --- |
| k | 100 mD | 20 mD |
| h | 20 ft. | 100 ft. |
| $r_d$ | 12 inches (in.) | 12 in. |
| $k_d$ | 10 mD | 2 mD |
| $S_o$ | 12.47 | 12.47 |
| $C_{2,j}$ | 2 ft./gal. | 2 ft./gal. |
| $r_g$ | 10 ft. | 3 ft. |

In Example 1, injected gas is modeled to invade only the top layer due to increased permeability and gravity override (Table 2), while in Example 2 a considerable amount of gas invades the lesser-permeability layer as well (Table 3).

Figure 3:
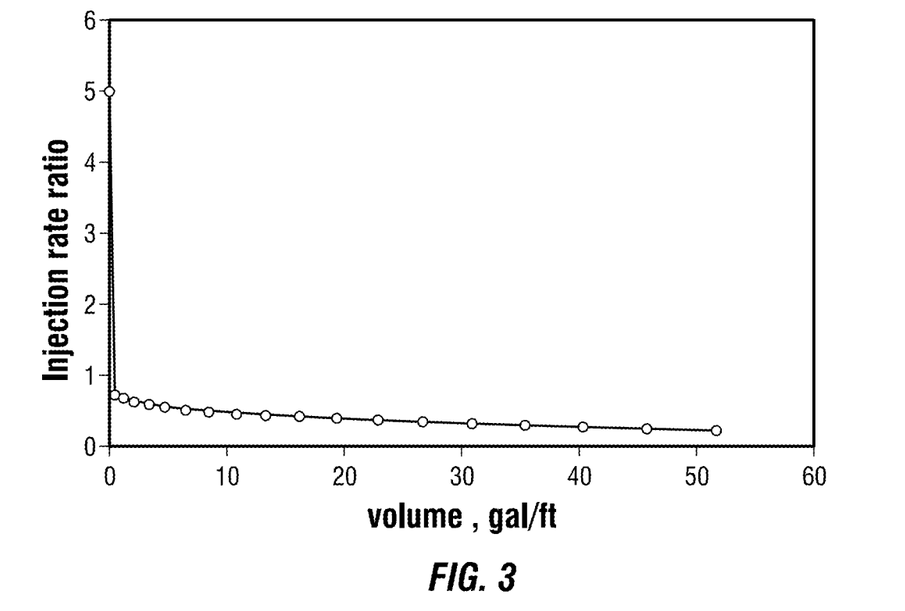
FIG. 3 is a graph showing the injection rate ratio versus volume for Example 1.
Figure 4:
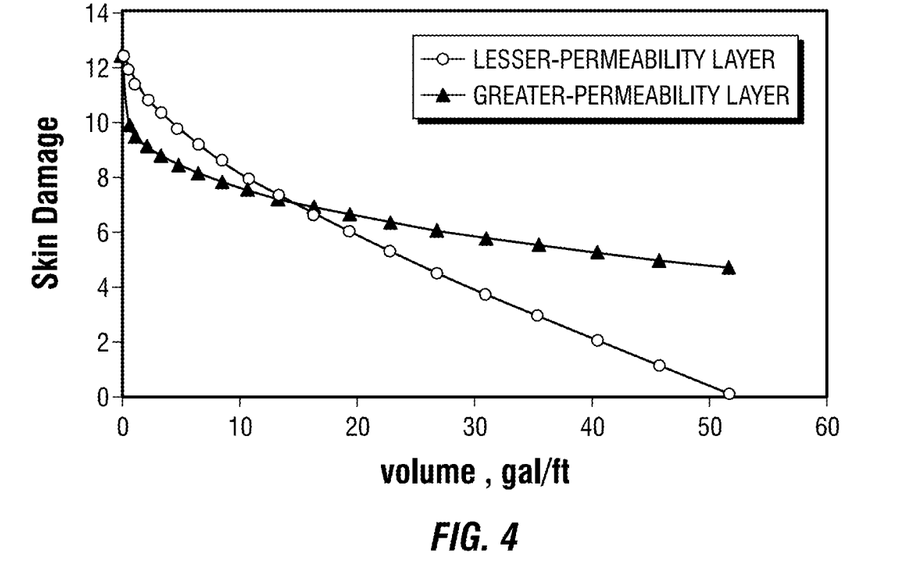
FIG. 4 is a graph showing the change in skin damage for Example 1.
Figure 5:
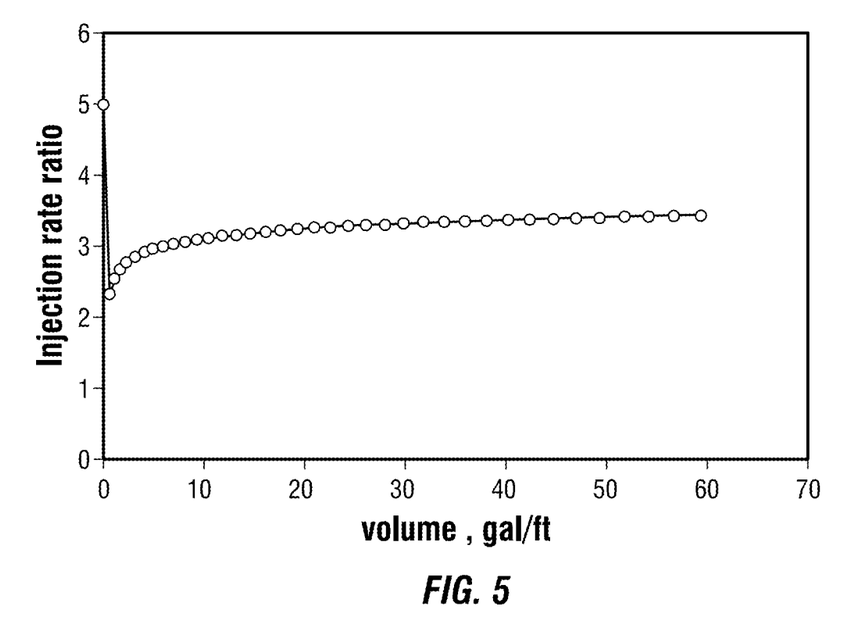
FIG. 5 is a graph showing the injection rate ratio versus volume for Example 2.
Figure 6:
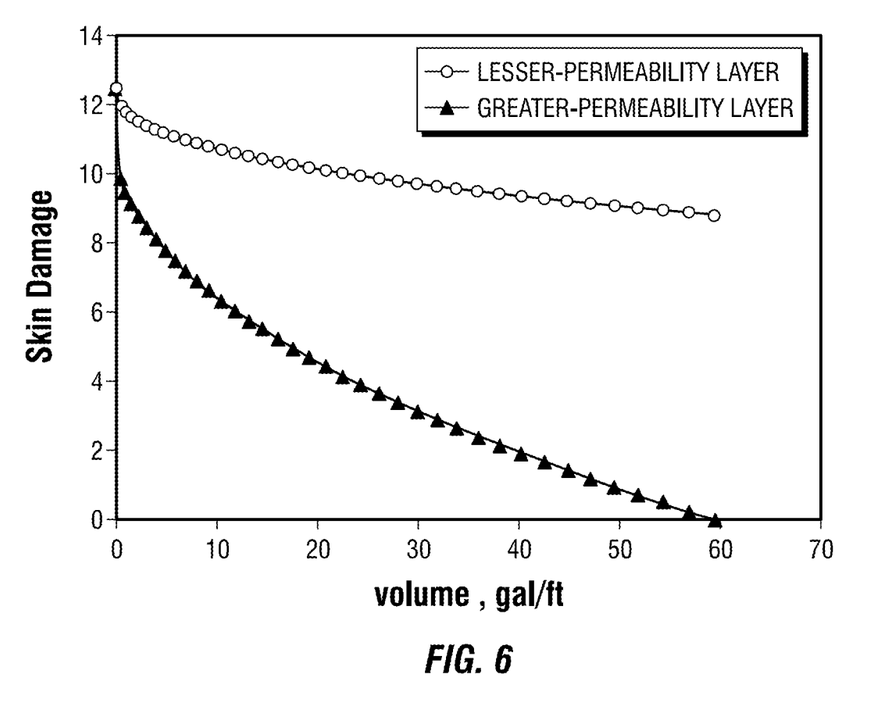
FIG. 6 is a graph showing the change in skin damage for Example 2.

FIG. 3 is a graph showing the injection rate ratio versus volume for Example 1. FIG. 4 is a graph showing the change in skin damage for Example 1. FIG. 5 is a graph showing the injection rate ratio versus volume for Example 2. FIG. 6 is a graph showing the change in skin damage for Example 2. As shown in FIGS. 3 and 5, the ratio of acid injection rates between the two layers significantly decreased because of the gas, which indicates that the acid was successfully diverted to the lesser-permeability layer in both cases. In FIGS. 3 and 5, the Y axis represents the injection rate ratio, Q2/Q1 in the greater- and lesser-permeability zones. The X axis represents the volume injected per foot thickness of the formation.

In Example 1, the ratio of injection rates continued to decrease, and the skin damage of the lesser-permeability layer reached zero before the greater-permeability layer (as shown in FIG. 4). In contrast, in Example 2 when the gas invades both layers, the ratio of acid injection rates between the two layers first decreased then gradually increased until it reached a value less than the initial value (FIG. 5), showing a similar behavior to the acid treatment in gas reservoirs. The skin damage of the greater-permeability layer reached zero before the lesser-permeability layer, as shown in FIG. 6. Therefore, gas can act as an advantageous and effective acid diverter in oil, gas, and water reservoirs, and generally for the more acid that is injected, the more likely diversion occurs.

Figure 7:
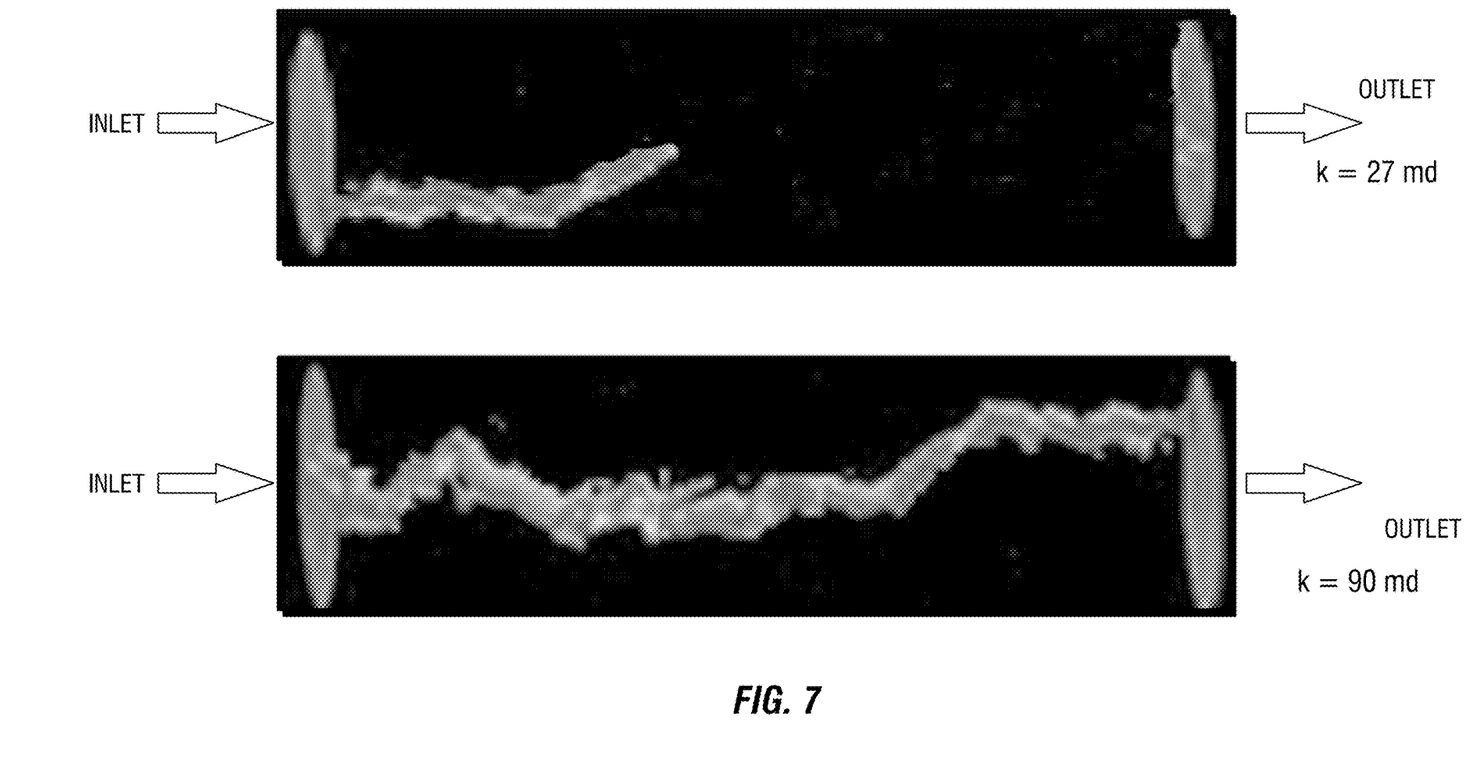
FIG. 7 shows computed tomography (CT) scan images for wormholes created for two limestone cores saturated with fresh water.

FIG. 7 shows computed tomography (CT) scan images for wormholes created for 2 limestone cores saturated with fresh water. Each core was treated with 15 weight percent (wt. %) HCl. Most of the treatment acid flowed through the greater-permeability core (90 mD), and less acid flowed into the lesser-permeability core (27 mD). Only the greater-permeability core was considered stimulated in this case. Since both cores, 90 mD and 27 mD, were saturated with water when HCl acid was injected, it flowed through the greater-permeability core and increased its permeability from 90 mD to about 2000 mD. The lesser-permeability core was not stimulated efficiently because the acid did not penetrate through the whole core, as shown. In this case 15 wt. % HCl was applied, and the injection rate was 5 cubic centimeters ($cm^3$)/min, and the treatment proceeded for about 7 minutes. Cores were placed in parallel core holders and the acid was placed in a transfer cell, then an ISCO syringe pump was used to inject the acid at a constant injection rate. Downstream pressure was fixed at 1,000 psi for both cores. The acid was injected through common tubing and then connected by a T-connection to the inlets of the two cores. The two experiments represented in FIGS. 7 and 8 were performed at room temperature, and both at increased pressure, where downstream pressure was 1000 psig and overburden pressure was 1500 psig in both cases.

Figure 8:
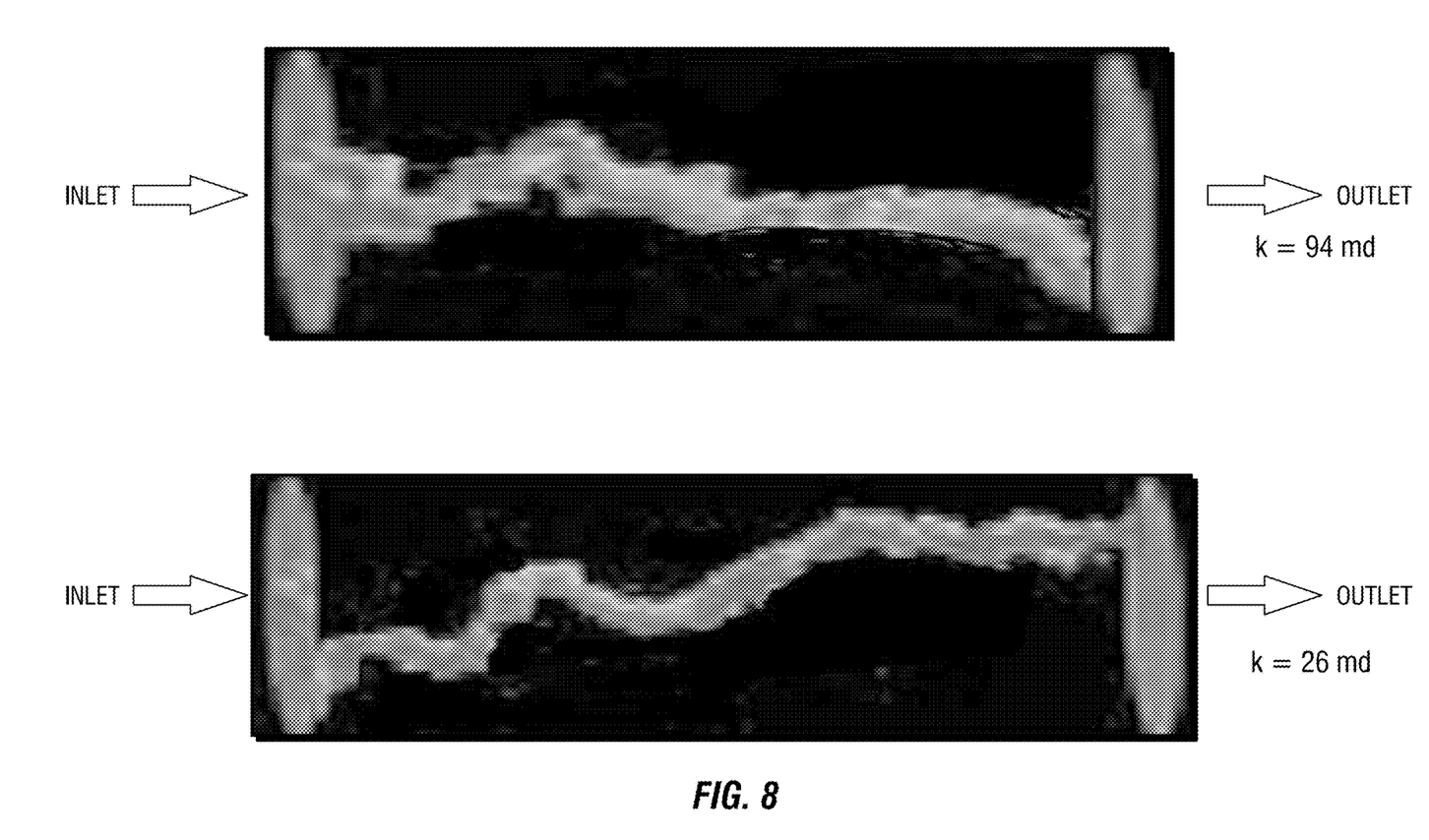
FIG. 8 shows CT scan images for wormholes created for two limestone cores, the greater-permeability core saturated with nitrogen gas and the lesser-permeability core saturated with fresh water.

FIG. 8 shows CT scan images for wormholes created for two limestone cores, the greater-permeability core saturated with nitrogen gas and the lesser-permeability core saturated with fresh water. The acid was injected through common tubing and then connected by a T-connection to the inlets of the two cores. With nitrogen gas present in the greater-permeability core, either or both generated in situ or injected, injected HCl acid was diverted to the lesser-permeability core, and the two cores were stimulated, and wormholes penetrated the two core samples. The core length was 12 inches and the core diameter was 1.5 inches. All cores exhibited an average porosity of 20%. Both injection and generation of nitrogen gas in situ showed similarly successful acid diversion to the lesser-permeability core.

As shown by the field test of FIGS. 2A and 2B, models, and examples described here gas injection in addition to or alternative to gas generation in situ can be used to dispose gas in a greater-permeability rock to drive a treatment liquid such as acid to a lesser-permeability rock with trapped hydrocarbons. Systems, methods, and compositions of the present disclosure result in more uniform treatment of zones in hydrocarbon-bearing reservoirs with varying permeability. Treatments can be applied in oil producer wells, water injector wells, water supply wells, and water disposal wells. In some embodiments, the in situ generated acid includes HCl that can be used to acidize carbonate formations for enhanced oil and gas recovery.

Treatments can be applied in 100% limestone formations, mixed limestone and dolomite formations, or 100% dolomite formations at temperatures up to about 350° F. Treatment systems and methods described here can eliminate the use of chemical and mechanical diverters and corrosion inhibitors as well. In oil and water wells, nitrogen gas can be injected from the surface, in addition to or alternative to being generated in situ, then HCl injection in addition to or alternative to generation can follow the nitrogen disposal in a greater-permeability zone. HCl will flow toward the greater-permeability zone with nitrogen disposed in the greater-permeability zone, and the viscous skin factor will force the acid to flow away from the greater-permeability zone and through the lesser-permeability rocks.

Treatment parameters including chemical concentration, treatment volume, and injection duration can be selected based on the condition of the targeted zone, for example, the type, amount, and extent of rock formation for stimulation treatment. In one embodiment, if the targeted region for treatment around a wellbore is large (in other words the radius of a zone for treatment such as acid treatment is extensive radially outwardly around a wellbore, for example about 10 ft. or about 100 ft.), then chemical concentration in addition to or alternative to the treatment volume should be increased to ensure that sufficient gas and acid will be generated in situ from an exothermic reaction, and the whole region surrounding the wellbore will be treated sufficiently.

Depending on the concentration and amounts of thermochemicals used, generated pressure can create microfractures that reduce the capillary pressure in the near-wellbore and that will help eliminate water accumulation. However, in other embodiments, the concentration and amounts of thermochemicals are designed to avoid fracturing and microfracturing.

Downhole steam and heat generated can also reduce the viscosity of blocking fluids, cause water vaporization, and by either or both mechanisms remove water blockages and condensates.

Thermochemical systems and methods of the present disclosure can be applied in, for example, tight formations, sandstone formations, carbonate formations, and in gas wells, including those wells in unconventional reservoirs with lesser-permeability rocks. Fracturing fluids used in overbalanced drilling can be damaging to the permeability of the formation, and the disclosed systems and methods here result in enhanced productivity of gas wells, for example. An exothermic reaction component, for example, optionally containing a nitrite ion and an ammonium ion, is applied either separately or together to wellbores or reservoirs, for example, in laterals.

With concentric coiled tubing, two fluids of a thermochemical exothermic reaction component, for example, an ammonium ion containing fluid and a nitrite ion containing fluid, can be injected separately into a target wellbore or lateral and then combined to provide control over the placement of and reaction of exothermic chemicals. In some embodiments, a single exothermic reaction component can be introduced with encapsulated chemicals, such that the chemicals do not react to produce heat and pressure until they are proximate the sand face in a given lateral.

Ultra-tight formations include those reservoir rocks where permeability can be in the nano-Darcy range making production of the hydrocarbons nearly impossible without a large stimulation treatment. Generally, a standard formation has a permeability greater than about 10 mD, such as in a permeable sandstone or limestone formation. Tight formations have lesser permeability, in general less than about 1 mD, such as a tight sandstone formation. Ultra-tight formations have permeability generally less than about 0.01 mD, such as in shale formations. Treatment volume, chemical concentration, and the operation duration increase as the formation tightness increases. Among all mentioned formations, ultra-tight formations require the greatest chemical concentration, greatest treatment volume and longest treatment time. Multi-stage fracturing can reach up to 100 stages per well.

The exothermic reaction component can include one or more redox reactants that exothermically react to produce heat and increase pressure. Exothermic reaction components include urea, sodium hypochlorite, ammonium containing compounds, and nitrite containing compounds. In at least one embodiment, the exothermic reaction component includes ammonium containing compounds. Ammonium containing compounds include ammonium chloride, ammonium bromide, ammonium nitrate, ammonium sulfate, ammonium carbonate, and ammonium hydroxide. In at least one embodiment, the exothermic reaction component includes nitrite containing compounds. Nitrite containing compounds include sodium nitrite and potassium nitrite. In at least one embodiment, the exothermic reaction component includes both ammonium containing compounds and nitrite containing compounds. In at least one embodiment, the ammonium containing compound is ammonium chloride, $NH_4Cl$. In at least one embodiment, the nitrite containing compound is sodium nitrite, $NaNO_2$.

In a reaction of the exothermic reaction components according to Equation 1, generated gas can contribute to a reduction of viscosity of residual viscous materials in the fractures of a formation possibly left behind from well fracturing operations (for example, guar gum). The heat and gas generated can also reduce the viscosity of viscous hydrocarbons, for example, asphaltenes, further increasing hydrocarbon recovery. Water blockage removal occurs as discussed previously in addition to or alternative to removal of other blockage materials.

The exothermic reaction component is triggered to react. In at least one embodiment, the exothermic reaction component is triggered within a wellbore or within laterals in addition to or alternative to triggered in pre-existing fractures. In at least one embodiment of the present disclosure, an acid precursor triggers the exothermic reaction component to react by releasing hydrogen ions, and in some embodiments the acid precursor is completely consumed by the exothermic reaction such that no residual acid remains to damage the formation or the well.

In at least one embodiment, the exothermic reaction component is triggered by heat. The wellbore temperature and temperature of laterals can be reduced during a pre-pad injection or a pre-flush with brine and reach a temperature less than 120° F. (48.9° C.). An exothermic thermochemical treatment fluid of the present disclosure can then be injected into the well, and the wellbore temperature increases from the heat of the formation. When the wellbore and lateral temperatures reach a temperature greater than or equal to about 120° F., for example, or between about 50° C. to 100° C., for example, depending on the composition of the exothermic reaction component, the reaction of redox reactants is triggered. In at least one embodiment of the present disclosure, the reaction of the redox reactants is triggered by temperature in the absence of the acid precursor. In at least one embodiment of the present disclosure, the exothermic reaction component is triggered by heat when the exothermic reaction component is within multi-branched laterals, optionally proximate pre-existing fractures.

In at least one embodiment, the exothermic reaction component is triggered by pH. A base can be added to an exothermic reaction component of the present disclosure to adjust the pH to between about 9 to about 12. In at least one embodiment, the base is potassium hydroxide. The exothermic reaction component, optionally along with other components such as fracturing fluid, is then injected into the formation with the base. Following the injection of the fracturing fluid, an acid is injected to adjust the pH to less than about 6. When the pH is less than about 6, the reaction of the redox reactants is triggered. In at least one embodiment of the present disclosure, the exothermic reaction component is triggered by pH when the exothermic reaction component is within the fractures. In some embodiments, no base or basic buffer is used to control the activation or reaction of the exothermic reaction component.

Dual-string coiled tubing can be used to introduce the exothermic reaction component and the acid precursor to the wellbore and the laterals. In at least one embodiment, the exothermic reaction component includes $NH_4Cl$ and $NaNO_2$. The acid precursor can include acetic acid. In some embodiments, the acetic acid is mixed with $NH_4Cl$ and is injected in parallel with the $NaNO_2$, using different sides of the dual-string coiled tubing. The exothermic reaction component and the acid precursor can mix within the wellbore or fractures of a formation.

In methods of the present disclosure, the exothermic reaction component is mixed to achieve a pre-selected solution pH. The pre-selected solution pH is in a range of about 6 to about 9.5, alternately about 6.5 to about 9. In at least one embodiment, the pre-selected solution pH is 6.5.

In at least one embodiment, the exothermic reaction component reacts when the exothermic reaction component reaches the wellbore temperature or the formation temperature. The wellbore temperature or formation temperature can be between about 100° F. and about 250° F., alternately between about 120° F. and about 250° F., alternately between about 120° F. and about 230° F., alternately between about 140° F. and about 210° F., alternately about 160° F. and about 190° F. In at least one embodiment, the wellbore temperature is about 200° F. In at least one embodiment, the wellbore temperature at which the exothermic reaction component reacts is affected by the pre-selected solution pH and an initial pressure. The initial pressure is the pressure of the exothermic reaction component just prior to the reaction of the exothermic reaction component. Increased initial pressure can increase the wellbore temperature that triggers the reaction of the exothermic reaction component. Increased pre-selected solution pH can also increase the wellbore temperature that triggers the reaction of the exothermic reaction component.

In embodiments here, the exothermic reaction component of a thermochemical treatment method can be present at concentrations or volumes to cause pressure pulses or formation fracturing, either of which can be applied in combination with stimulation treatment diversion.

In at least one embodiment, the method also cleans up or removes from a wellbore or formation a viscous material, for example, asphaltenes, or a residual viscous material, for example, guar.

In some embodiments, microwaves can be applied in situ to aid in triggering an exothermic reaction component.

The term "about" when used with respect to a value or range refers to values including plus and minus 5% of the given value or range.

The singular forms "a," "an," and "the" include plural referents, unless the context clearly dictates otherwise.

In the drawings and specification, there have been disclosed embodiments of compositions, systems, and methods for thermochemical gas diversion of stimulation treatments, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:
1. A reservoir stimulation treatment diversion method, the method comprising:
   identifying a reservoir requiring liquid stimulation treatment in a lesser-permeability portion of the reservoir;
   identifying a greater-permeability portion of the reservoir, the greater-permeability portion of the reservoir having a greater permeability than the lesser-permeability portion;

disposing a gas in the greater-permeability portion of the reservoir via in situ gas generation from an exothermic reaction of thermochemicals;

injecting a liquid stimulation treatment into the reservoir; and allowing the gas in the greater-permeability portion of the reservoir to divert the liquid stimulation treatment into the lesser-permeability portion to stimulate fluid production from the lesser-permeability portion of the reservoir to control a temperature profile in the lesser-permeability portion of the reservoir.

2. The method according to claim 1, where the permeability of the greater-permeability portion is greater than about 80 milliDarcy (mD) and where the permeability of the lesser-permeability portion is less than about 40 mD.

3. The method according to claim 1, where disposing is carried out before injecting.

4. The method according to claim 1, where disposing is carried out during injecting.

5. The method according to claim 1, where disposing is carried out after injecting.

6. The method according to claim 1, where disposing includes injecting a gas from the surface into the greater-permeability portion, the gas including at least one component selected from the group consisting of: carbon dioxide, methane, ethane, and nitrogen.

7. The method according to claim 1, where the thermochemicals include ammonium ions and nitrite ions.

8. The method according to claim 1, where injecting includes injecting an acid composition including at least one acid selected from the group consisting of: hydrochloric acid and hydrofluoric acid.

9. The method according to claim 1, where injecting includes injecting a composition that reacts in situ to produce an acid and the gas, the acid selected from the group consisting of: hydrochloric acid, hydrofluoric acid, and combinations of the same.

10. The method according to claim 1, further comprising the step of verifying stimulated fluid production from the lesser-permeability portion of the reservoir by calculating decreased skin damage for the lesser-permeability portion.

11. The method according to claim 1, where the permeability of the lesser-permeability portion is increased by at least 100%.

12. The method according to claim 1, where the thermochemicals comprise a component selected from the group consisting of: ammonium chloride, ammonium bromide, ammonium nitrate, ammonium sulfate, ammonium carbonate, ammonium hydroxide, and combinations thereof.

13. The method according to claim 1, where the thermochemicals comprise a component selected from the group consisting of: sodium nitrite, potassium nitrite, and combinations thereof.

14. The method according to claim 1, where the thermochemicals comprise $NH_4C_1$ and $NaNO_2$.

15. The method according to claim 14, where concentrations of the $NH_4C_1$ and $NaNO_2$ are about 1 molar and where the $NH_4C_1$ and $NaNO_2$ are injected separately during injecting and combined in situ to exothermically react.

16. The method according to claim 14, where the thermochemicals are triggered at a temperature in situ between about 50° C. and about 300° C.

17. The method according to claim 14, further comprising activating the thermochemicals with at least one of microwaves, an acid, or combinations of the same.

18. The method according to claim 1, where the reservoir comprises at least one component selected from the group consisting of: limestone and dolomite.

19. The method according to claim 1, where injecting is selected from an injection type of continuous injection, cyclic injection, huff-n-puff injection, and combinations of the same.

20. The method according to claim 1, where disposing and injecting are carried out separately so as not to create foam or foamed acid.

21. The method according to claim 1, where disposing a gas in the greater-permeability portion of the reservoir does not cause fracturing.

22. The method according to claim 1, where injecting a liquid stimulation treatment in the reservoir does not cause fracturing.

23. The method according to claim 1, where the steps of disposing a gas in the greater-permeability portion of the reservoir and injecting a liquid stimulation treatment in the reservoir do not cause fracturing.

* * * * *

UNITED STATES PATENT AND TRADEMARK OFFICE
CERTIFICATE OF CORRECTION

PATENT NO. : 11,268,017 B2
APPLICATION NO. : 16/817305
DATED : March 8, 2022
INVENTOR(S) : Ayman Al-Nakhli and Mohamed Ahmed Nasr Eldin Mahmoud Page 1 of 1

It is certified that error appears in the above-identified patent and that said Letters Patent is hereby corrected as shown below:

In the Claims

In Claim 10, Column 15, Line 39, the claim language reads:
"comprising the step of verifying"
It should read:
"comprising verifying"

In Claim 23, Column 16, Line 38, the claim language reads:
"where the steps of"
It should read:
"where"

Signed and Sealed this
Twenty-first Day of June, 2022

Katherine Kelly Vidal
*Director of the United States Patent and Trademark Office*